(12) United States Patent
Fernald et al.

(10) Patent No.: US 11,247,212 B2
(45) Date of Patent: Feb. 15, 2022

(54) REACTOR SYSTEM FOR SEPARATION AND ENRICHMENT OF MINERALS FROM A SLURRY CONTAINING MINERALS AND OTHER MATERIALS

(71) Applicant: CiDRA Corporate Services LLC, Wallingford, CT (US)

(72) Inventors: Mark R. Fernald, Enfield, CT (US); Paul J. Rothman, Windsor, CT (US); Paul Dolan, Portland, CT (US); Kirk Johnson, Killingworth, CT (US); Patrick Tuxbury, Wallingford, CT (US); Sandeep Balasubramanyam, Hamden, CT (US); Peter A. Amelunxen, Colebay (SX); Timothy J. Bailey, Longmeadow, MA (US); Adam Jordens, West Hartford, CT (US); Joseph Nord, Plantsville, CT (US)

(73) Assignee: CIDRA CORPORATE SERVICES, INC., Wallingford, CT (US)

( * ) Notice: Subject to any disclaimer, the term of this patent is extended or adjusted under 35 U.S.C. 154(b) by 0 days.

(21) Appl. No.: 16/346,706

(22) PCT Filed: Nov. 1, 2017

(86) PCT No.: PCT/US2017/059491
§ 371 (c)(1),
(2) Date: May 1, 2019

(87) PCT Pub. No.: WO2018/085364
PCT Pub. Date: May 11, 2018

(65) Prior Publication Data
US 2019/0275533 A1 Sep. 12, 2019

Related U.S. Application Data

(63) Continuation-in-part of application No. PCT/US2016/068843, filed on Dec. 28, 2016, and a
(Continued)

(51) Int. Cl.
*B03B 7/00* (2006.01)
*B03B 5/56* (2006.01)
(Continued)

(52) U.S. Cl.
CPC ............... *B03B 7/00* (2013.01); *B01D 17/02* (2013.01); *B03B 5/56* (2013.01); *B03D 1/023* (2013.01); *C22B 1/00* (2013.01)

(58) Field of Classification Search
CPC .... B03B 1/04; B03B 5/56; B03B 7/00; B03B 9/00; B03B 9/005; B03B 11/00;
(Continued)

(56) References Cited

U.S. PATENT DOCUMENTS 2,701,641 A * 2/1955 Krijgsman ............... B03B 5/30
  209/17
2,942,731 A * 6/1960 Soldini ................... B03B 9/063
  209/293
(Continued)

FOREIGN PATENT DOCUMENTS

WO 2006106234 10/2006
WO 2012151551 11/2012
(Continued)

*Primary Examiner* — Joseph C Rodriguez
(74) *Attorney, Agent, or Firm* — Ware, Fressola, Maguire & Barber LLP

(57) ABSTRACT

A reactor system has a number of stations arranged to recover mineral particles in a slurry. The system includes a hopper to receive the slurry and barren media having hydrophobic coating to attract the mineral particles. The hopper provides a mixture of barren media and slurry to a tumbler
(Continued)

arranged to stir the mixture in order to increase the contact between the slurry and the barren media so as to allow the mineral particles to attach to the barren media to form mineral laden media. The mineral laden media are conveyed to a rinsing station where water jets are used to wash the gangue materials off the mineral laden media. The rinsed mineral laden media are mixed with a surfactant so that the mineral particles are released from the mineral laden media. High-pressure water and air jets are then used to remove remaining surfactant from the released media.

12 Claims, 12 Drawing Sheets

Related U.S. Application Data continuation-in-part of application No. PCT/US2017/012689, filed on Jan. 9, 2017.

(60) Provisional application No. 62/415,629, filed on Nov. 1, 2016, provisional application No. 62/563,853, filed on Sep. 27, 2017.

(51) Int. Cl.
   *B03D 1/02* (2006.01)
   *C22B 1/00* (2006.01)
   *B01D 17/02* (2006.01)

(58) Field of Classification Search
   CPC ....... B07B 2230/01; F26B 5/00; B03D 1/023; C22B 1/00
   USPC .......................................................... 209/17
   See application file for complete search history.

(56) References Cited

U.S. PATENT DOCUMENTS

| | | | |
|---|---|---|---|
| 3,875,319 A | 4/1975 | Seckler et al. | |
| 4,025,057 A * | 5/1977 | Shearer | E01C 19/1031 366/11 |
| 4,039,425 A | 8/1977 | Neavel | |
| 4,437,982 A * | 3/1984 | Wasson | B03B 9/005 209/167 |
| 4,678,558 A * | 7/1987 | Belluteau | C10G 1/04 208/390 |
| 4,744,889 A | 5/1988 | Kruyer | |
| 4,874,393 A * | 10/1989 | Mikhlin | C10L 5/06 44/572 |
| 4,952,307 A * | 8/1990 | Adamache | B03B 9/00 209/166 |
| 5,028,398 A | 7/1991 | Hallberg et al. | |
| 5,513,443 A * | 5/1996 | Hatfield | E01C 19/05 34/106 |
| 5,624,077 A * | 4/1997 | Branscome | B03B 9/063 241/20 |
| 6,742,656 B2 * | 6/2004 | Watters | B03B 9/005 209/17 |
| 7,461,744 B2 * | 12/2008 | Hautala | D21B 1/32 209/44.3 |
| 8,201,693 B2 * | 6/2012 | Jan | B07B 1/50 209/293 |
| 9,004,284 B2 | 4/2015 | Bland et al. | |
| 9,518,241 B2 * | 12/2016 | Yoon | B03B 9/005 |
| 9,592,515 B1 * | 3/2017 | Adams | B03B 11/00 |
| 9,759,486 B2 * | 9/2017 | Bland | F26B 25/04 |
| 9,782,780 B2 * | 10/2017 | Adams | B03B 11/00 |
| 2004/0045902 A1 | 3/2004 | Fellers | |
| 2007/0170099 A1 | 7/2007 | Stolworthy | |
| 2014/0144812 A1 * | 5/2014 | Bland | F23K 1/00 209/3 |
| 2014/0183104 A1 | 7/2014 | Rothman et al. | |
| 2019/0009280 A1 * | 1/2019 | Rothman | B01F 9/0007 |
| 2020/0078795 A1 * | 3/2020 | Rothman | B03C 1/30 |

FOREIGN PATENT DOCUMENTS

| | | |
|---|---|---|
| WO | 2012162632 | 11/2012 |
| WO | 2013074151 | 5/2013 |
| WO | 2013112240 | 8/2013 |

* cited by examiner

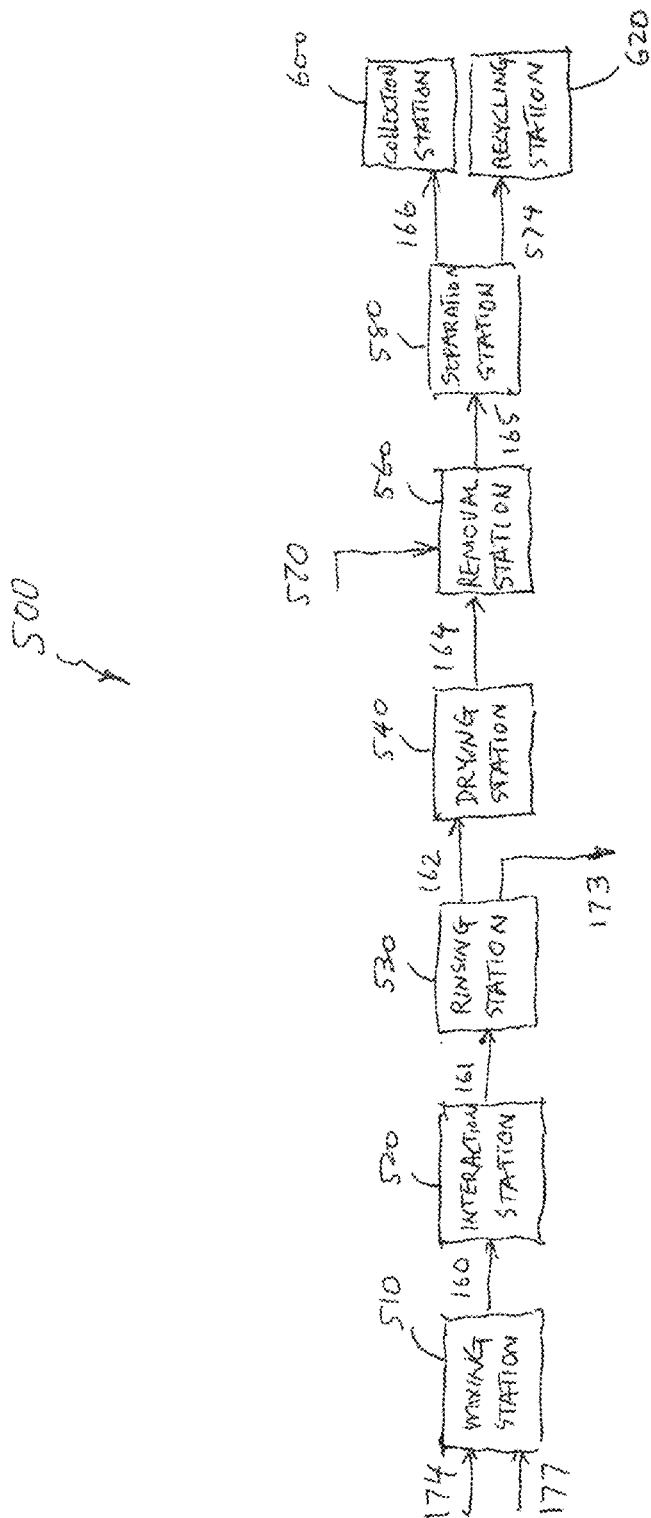

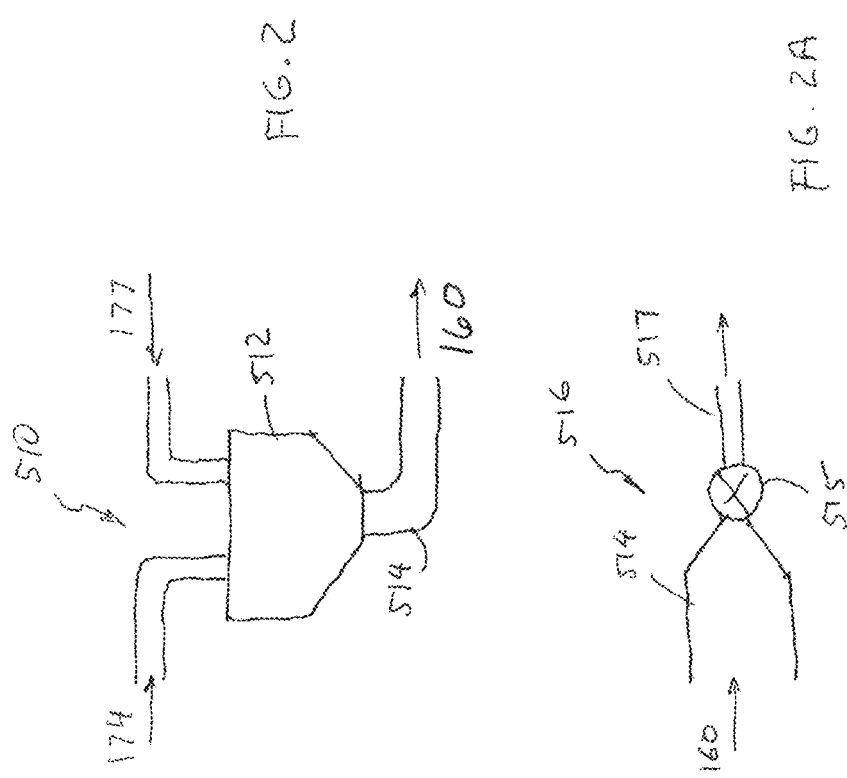

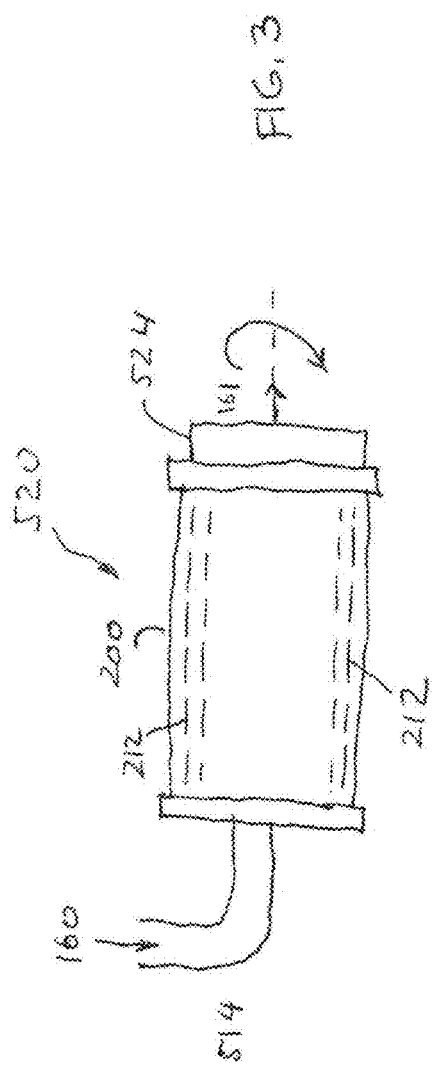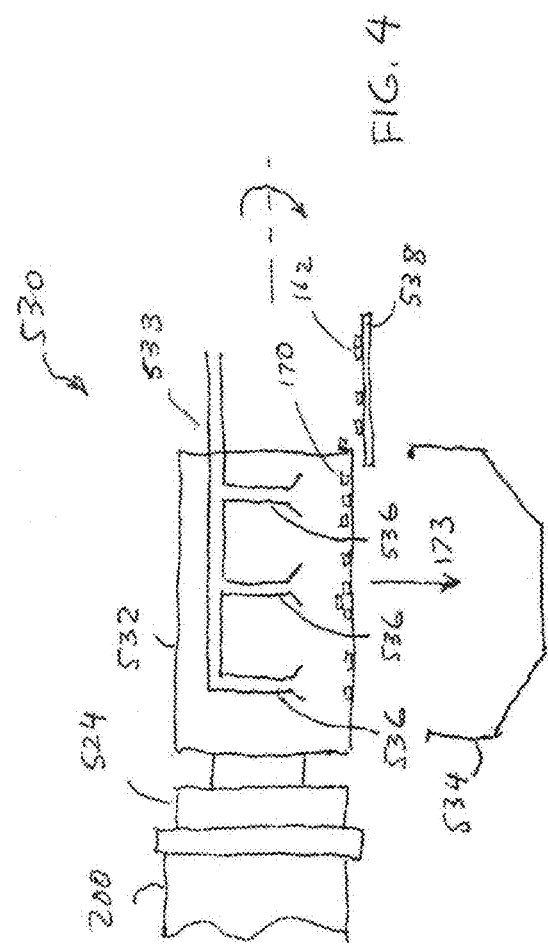

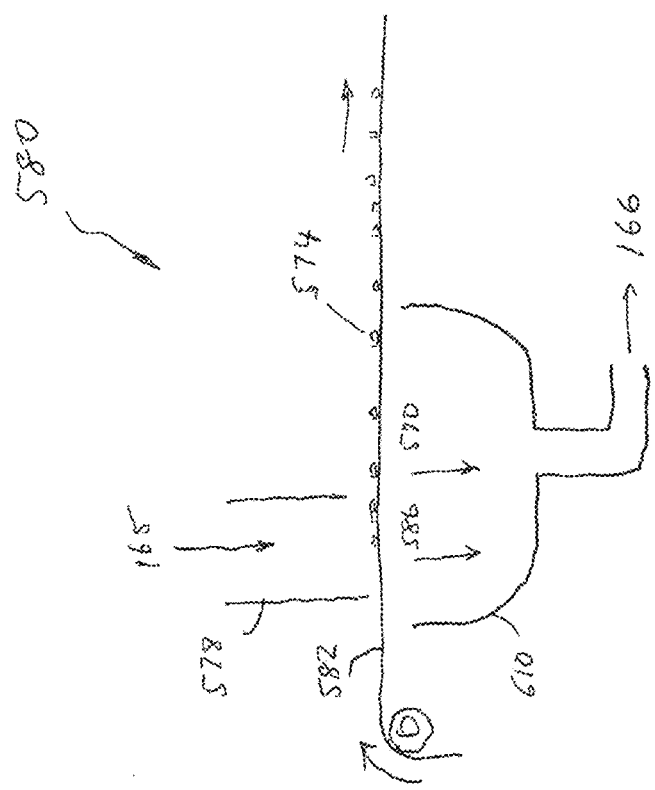

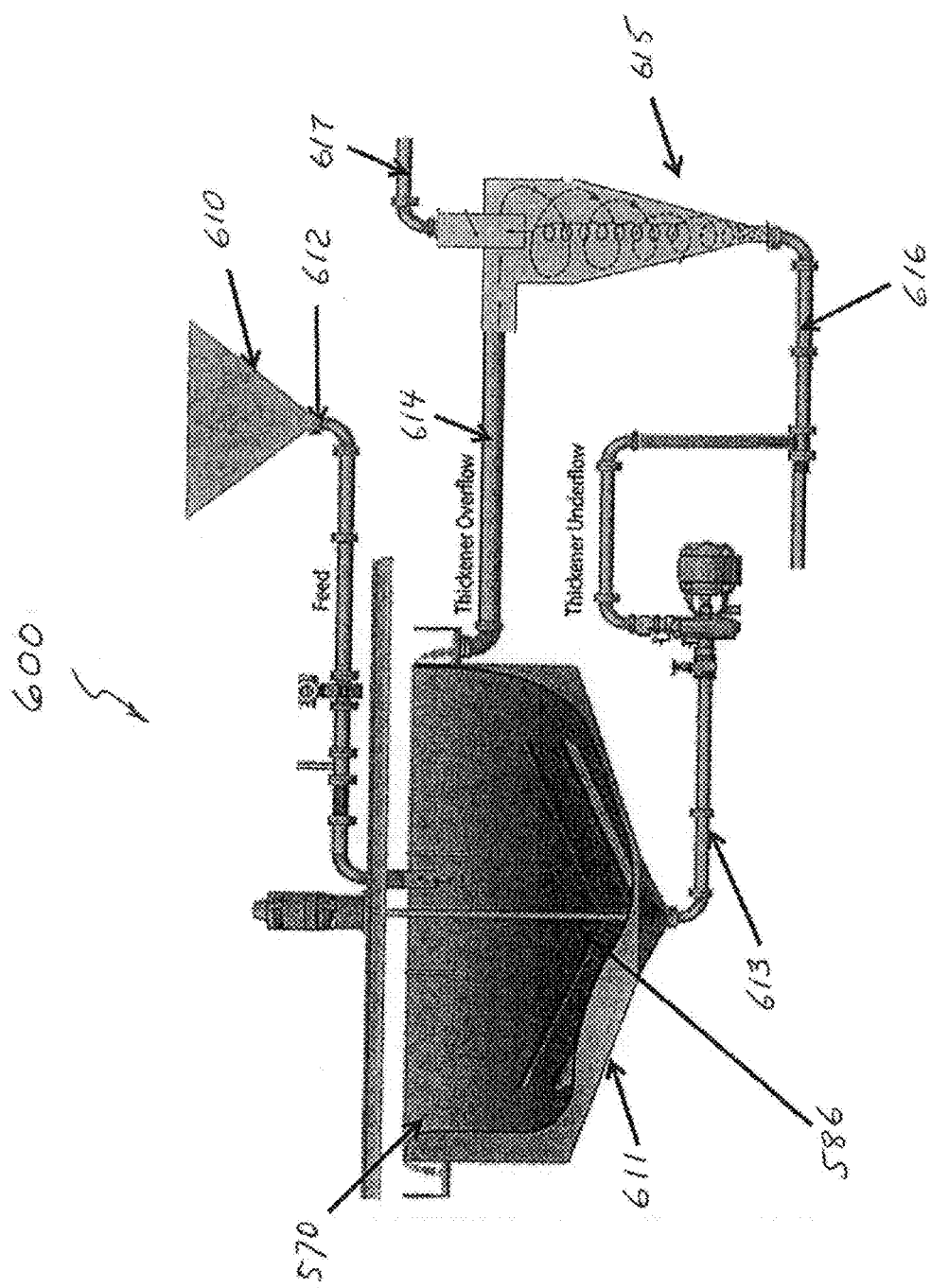

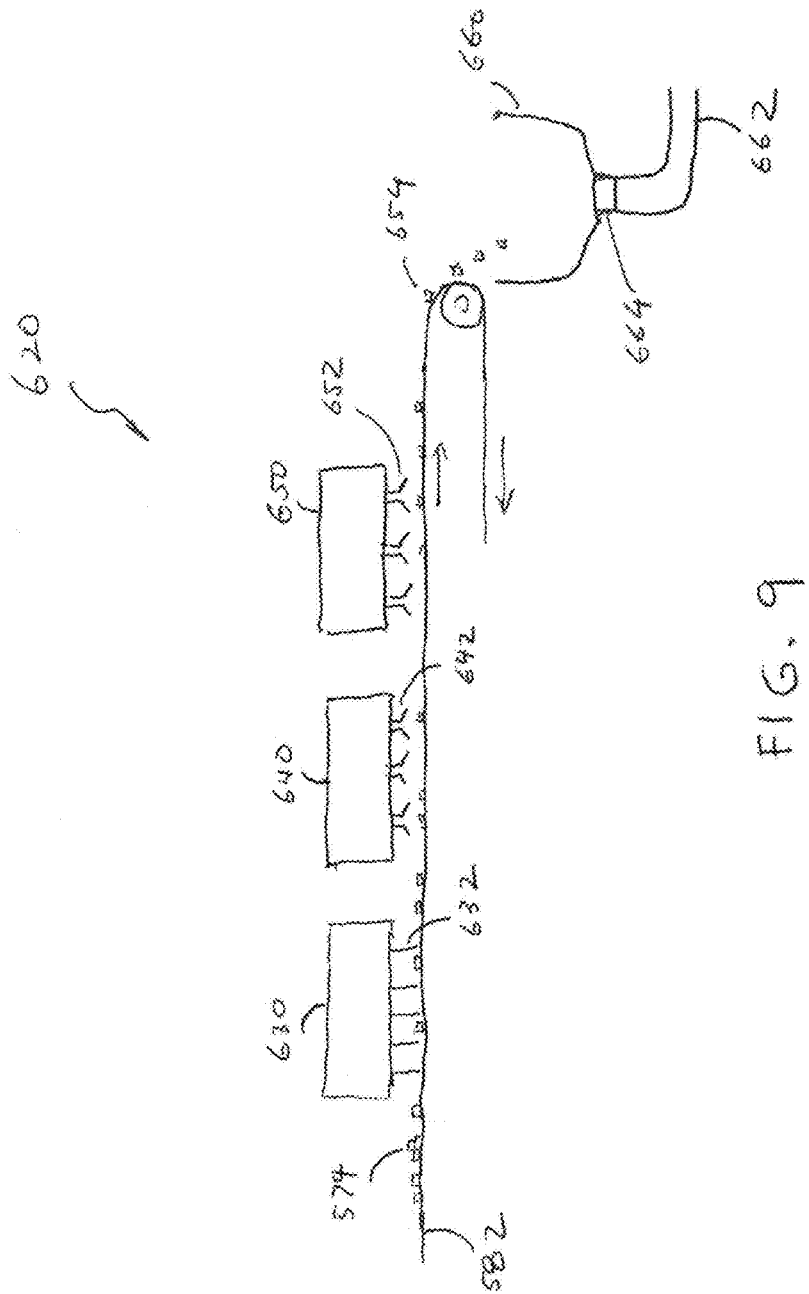

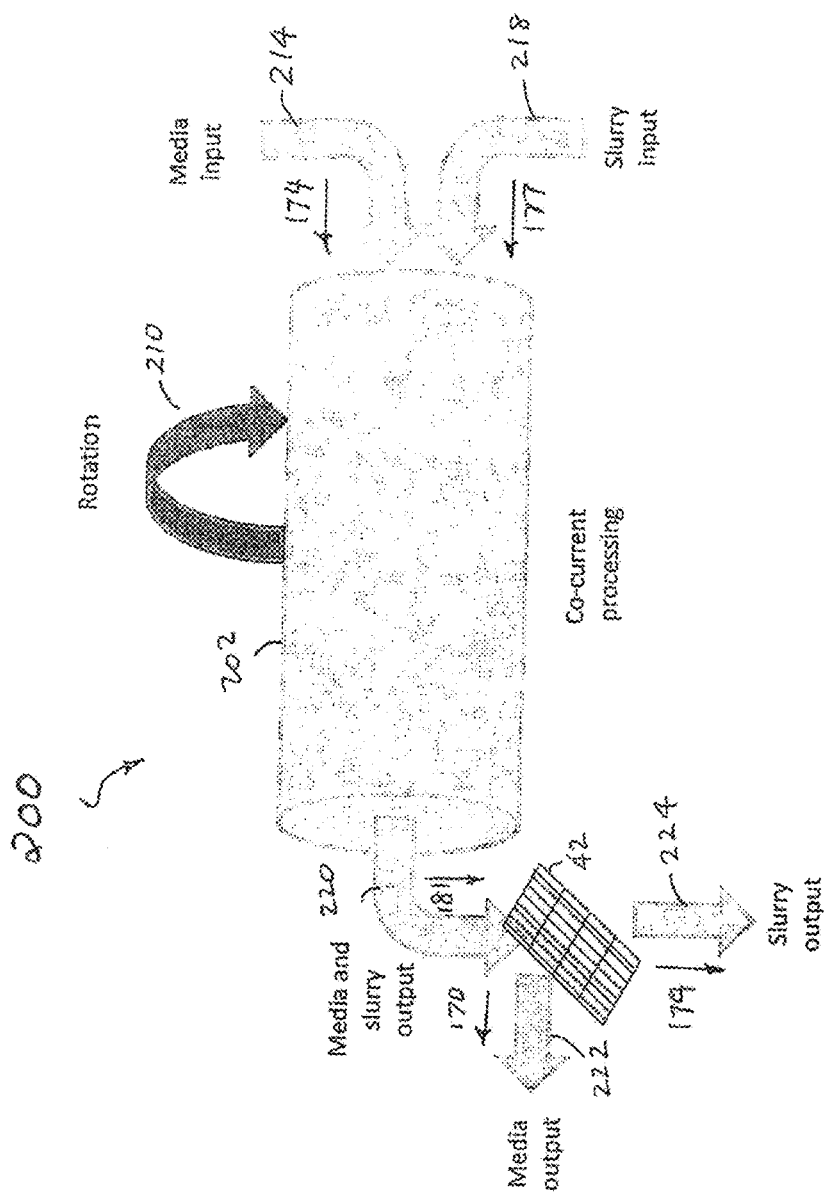

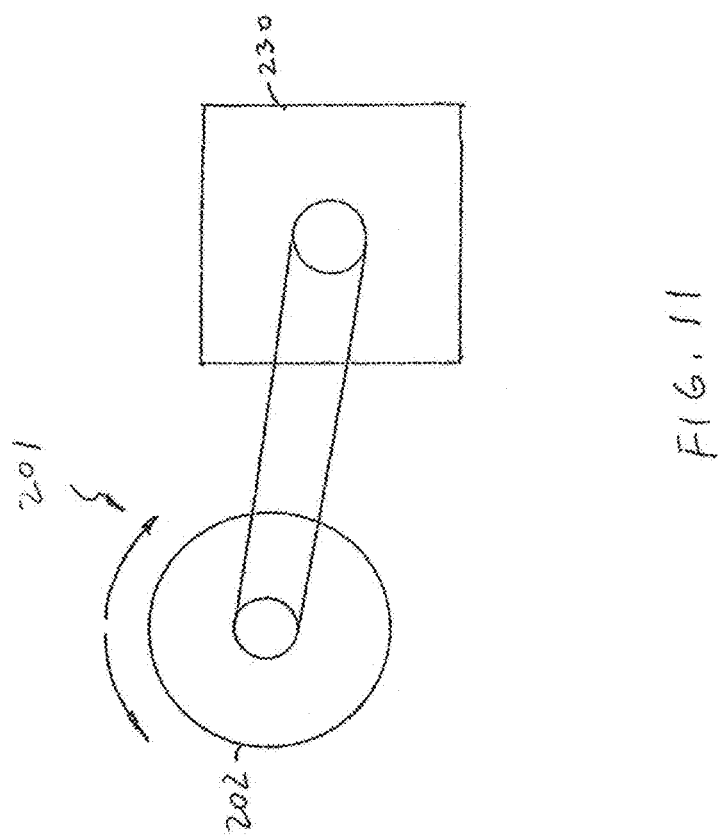

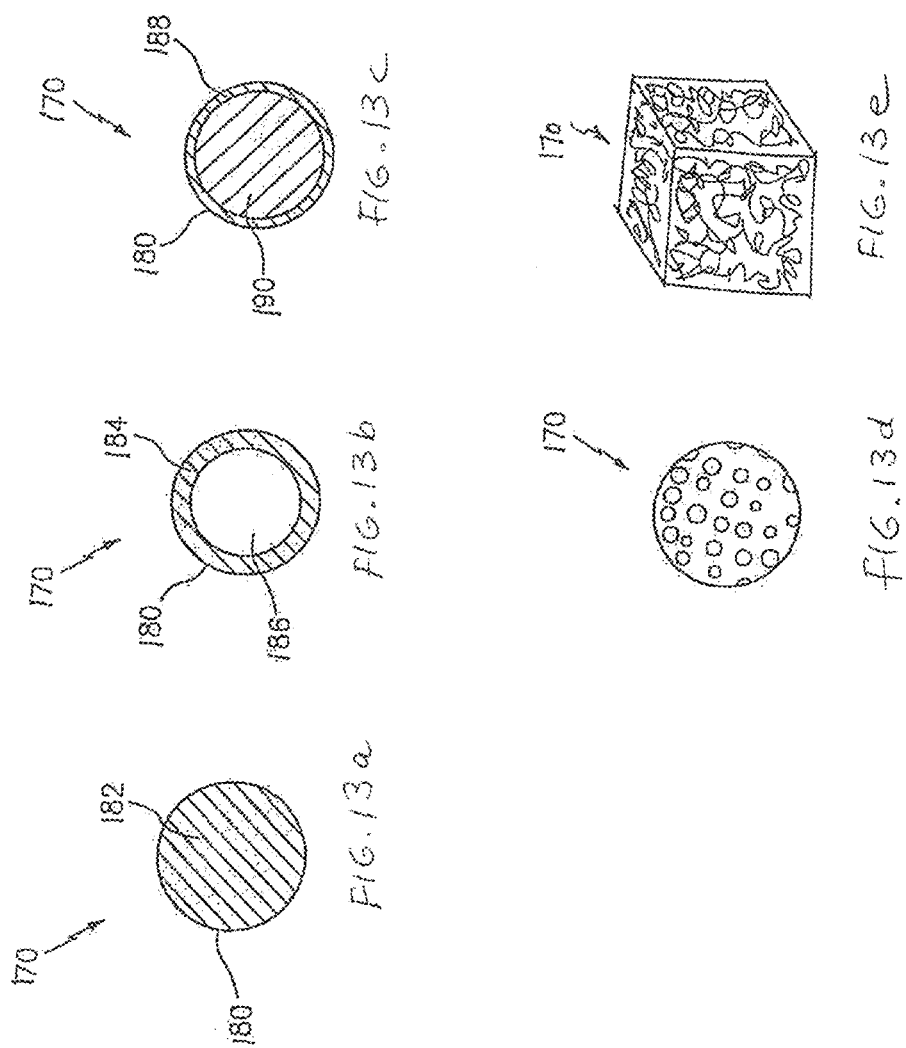

REACTOR SYSTEM FOR SEPARATION AND ENRICHMENT OF MINERALS FROM A SLURRY CONTAINING MINERALS AND OTHER MATERIALS

This application corresponds to international patent application no. PCT/US2017/059491, filed 1 Nov. 2017, which claims benefit to the following applications:

CROSS-REFERENCE TO RELATED APPLICATIONS

This application claims benefit to provisional application Ser. No. 62/415,629, filed 1 Nov. 2016 entitled "Reactor system for separation and enrichment of minerals from a slurry containing minerals and other materials," which is hereby incorporated by reference in its entirety.

This application claims benefit to provisional application Ser. No. 62/563,853, filed 27 Sep. 2017 entitled "Reactor system for separation and enrichment of minerals from a slurry containing minerals and other materials," which is hereby incorporated by reference in its entirety.

This application is also a continuation-in-part of pending application PCT/US16/68843, filed 28 Dec. 2016 entitled "Tumbler Cell Design For Mineral Recovery Using Engineered Media," which claims benefit to provisional application Ser. No. 62/272,026, filed 28 Dec. 2015 entitled "Tumbler Cell Design For Mineral Recovery Using Engineered Media," both of which are hereby incorporated by reference in its entirety.

This application also claims benefit to PCT application no. PCT/US12/12689, filed 9 Jan. 2017 entitled "Recovery media for mineral processing, using open cell or reticulated foam having 3-dimensional functionalized open-network structure for selective separation of mineral particles in an aqueous system", which claims benefit to provisional patent application Ser. No. 62/276,051, filed 7 Jan. 2016, entitled "Novel recovery media for mineral processing," both of which are hereby incorporated by reference in its entirety.

BACKGROUND OF THE INVENTION

1. Technical Field

This invention relates generally to a method and apparatus for separating valuable material from unwanted material in a mixture, such as a pulp slurry, or for processing mineral product for the recovery of minerals in a mineral extraction process.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

Flotation processing techniques for the separation of materials are a widely utilized technology, particularly in the fields of minerals recovery, industrial waste water treatment, and paper recycling for example.

By way of example, in the case of minerals separation the mineral bearing ore may be crushed and ground to a size, typically around 100 microns, such that a high degree of liberation occurs between the ore minerals and the gangue (waste) material. In the case of copper mineral extraction as an example, the ground ore is then wet, suspended in a slurry, or 'pulp', and mixed with reagents such as xanthates or other reagents, which render the copper sulfide particles hydrophobic.

Froth flotation may not be effective in collecting ore minerals in larger sizes. As a result, a substantial amount of ore minerals remains in the tailings.

The present invention provided a method and apparatus for the recovery of the minerals in a pulp slurry or in the tailings.

SUMMARY OF THE INVENTION

The present invention offers a solution to the above limitations of traditional mineral beneficiation. According to various embodiments of the present invention, minerals in a pulp slurry or in the tailings stream in a mineral extraction process, are recovered by applying engineered recovery media (as disclosed in commonly owned family of cases set forth below, e.g., including PCT application no. PCT/US12/39540, entitled "Mineral separation using Sized-, Weight- or Magnetic-Based Polymer Bubbles or Bead", and PCT application no. PCT/US16/62242, entitled "Utilizing Engineered Media for Recovery of Minerals in Tailings Stream at the End of a Flotation Separation Process") in accordance with the present invention. The process and technology of the present invention circumvents the performance limiting aspects of the standard flotation process and extends overall recovery. The engineered recovery media (also referred to as engineered collection media, collection media or barren media) obtains higher recovery performance by allowing independent optimization of key recovery attributes which is not possible with the standard air bubble in conventional flotation separation.

The present invention described a method and an apparatus for the recovery of the minerals in the pulp slurry and the minerals present in the tailings using engineered collection media based upon polymers that can be designed with varying specific gravities. This freedom allows new processing cell design wherein the collection media do not necessarily reach the top of the cell to form a froth layer. Instead, with various embodiments of the cell, the collection media can be introduced into and removed from the top, side or bottom of the cell. According to embodiments of the present invention, the cell is configured for rotation along a rotation axis while allowing the introduction of the collection media on one end of the cell and removal of the loaded media on the other end. The loaded media are also referred herein as mineral laden media or collection media with minerals captured on the media surface. The processing cell is also referred to as a tumbler cell.

Thus, the first aspect of the present invention is an apparatus, comprising:

a tumbler configured to stir a first mixture comprising engineered collection media and a slurry, the slurry containing mineral particles and unwanted materials, the tumbler having an output arranged to provide a second mixture comprising a reacted slurry and mineral laden media; and a rinsing station comprising a screen separator arranged to receive the second mixture, the rinsing station further comprising one or more spraying nozzles arranged to spray a cleaning liquid onto the second mixture so as to separate the reacted slurry from the mineral laden media, wherein the reacted slurry comprises unwanted materials.

According to an embodiment of the present invention, the tumbler has an interior surface and a plurality of ribs disposed on the interior surface, and the ribs are arranged to assist stirring of the first mixture.

According to an embodiment of the present invention, the apparatus further comprises a hopper arranged to receive the slurry and the engineered collection media and to provide the first mixture to the tumbler.

According to an embodiment of the present invention, the apparatus further comprises an enhancer device, the enhancer device having an input end and an output end narrower than the input end, the input end arranged to receive the first mixture, the enhancer device configured to force the first mixture received into the input end to move through the output end so as to increase a contact between the mineral particles in the slurry and the engineered collection media.

According to an embodiment of the present invention, the apparatus further comprises a drying station, wherein the screen separator comprises a plurality of openings dimensioned to allow the reacted slurry to pass there-through while retaining the mineral laden media on the screen separator, wherein the rinsing station is further arranged to transport the mineral laden media to the drying station.

According to an embodiment of the present invention, the apparatus further comprises a mineral removal station, wherein the mineral laden media comprise the cleaning liquid attached thereon in the rinsing station, and wherein the drying station comprises one or more air-jets arranged to blow high-pressure air streams onto the mineral laden media so as to remove the attached cleaning liquid from the mineral laden media, the drying station further arranged to provide cleaned mineral laden media to the mineral removal station.

According to an embodiment of the present invention, the cleaned mineral laden media comprise mineral particles attached thereon, and wherein the mineral removal station comprises an input port arranged to receive the cleaned mineral laden media, the mineral removal station further having an inlet arranged to receive a mineral removal agent configured to remove the attached mineral particles from the cleaned mineral laden media and to provide separated minerals and released media.

According to an embodiment of the present invention, the mineral removal station comprises a tumbling cylinder arranged to receive a third mixture containing the cleaned mineral laden media and the mineral removal agent, the tumbling cylinder having an internal surface and a plurality of fins disposed on the internal surface, the mineral station further comprising a plurality of rotating impellers located within the tumbling cylinder, wherein the fins and the rotating impellers are arranged to agitate the third mixture so as to enhance removal of the attached mineral particles from the cleaned mineral laden media.

According to an embodiment of the present invention, high-pressure air streams are also applied to the cleaned mineral laden media in order to overcome the van der Waals forces between the attached mineral particles and the barren media.

According to an embodiment of the present invention, the mineral removal station further comprises an output port arranged to discharge a fourth mixture containing the released media, the separated minerals and at least a part of the mineral removal agent, and the apparatus further comprises a conveyor belt arranged to receive the fourth mixture, the conveyor belt comprising a plurality of openings dimensioned to allow the separated minerals and said part of the mineral removal agent to pass through the openings while retaining the released media on the conveyor belt.

According to an embodiment of the present invention, the separated minerals passed through the openings in the conveyor belt are conveyed to a mineral collection vessel, and said part of the mineral removal agent passed through the openings in the conveyor belt are conveyed back to the inlet of the mineral removal station.

According to an embodiment of the present invention, the released media comprise a remaining part of the mineral removal agent, and wherein the conveyor belt is arranged to deliver the released media to a recycling drying station, the recycling drying station comprising one or more air-jets arranged to remove the remaining part of the mineral removal agent from the released media for providing dried media.

According to an embodiment of the present invention, the apparatus further comprises a recycling rinsing station, the recycling rinsing station comprising one or more water-jets arranged to spray high-pressure water streams onto the dried media for further removal of the remaining part of the removal agent from the dried media.

According to an embodiment of the present invention, the apparatus further comprises a dispersing station, the dispersing station comprising a plurality of rigid members disposed in relationship to the conveyor belt, the rigid members arranged to disperse the released media before the released media are delivered to the recycling drying station.

According to an embodiment of the present invention, the engineered collection media comprise collection surfaces functionalized with a chemical having molecules to attract the mineral particles to the collection surfaces so as to form mineral laden media.

According to an embodiment of the present invention, the engineered collection media comprise synthetic beads, and the chemical is selected from the group consisting of polysilloxanes, poly(dimethylsiloxane), hydrophobically-modified ethyl hydroxyethyl cellulose polysiloxanates, alkylsilane and fluoroalkylsilane.

According to an embodiment of the present invention, the synthetic beads are made of an open-cell foam.

The second aspect of the present invention is a processing system, comprising:

a mixing station arranged to receive engineered collection media and a slurry containing mineral particles and to provide a first mixture of the engineered collection media and the slurry, the engineered collection media functionalized with a hydrophobic material so as to attract the mineral particles;

an interaction station arranged to receive the first mixture, the second mixing station configured to enhance attaching of the mineral particles on the engineered collection media, wherein the second mixing station is further arranged to provide a second mixture comprising a plurality of mineral laden media and a reacted slurry;

a rinsing station arranged to receive the second mixture, the rinsing station comprising water spray nozzles arranged to separate the reacted slurry from the mineral laden media, the rinsing station further configured to discharge the reacted slurry and separately provide rinsed mineral laden media;

a drying station arranged to remove water from the rinsed mineral laden media for providing clean mineral laden media;

a removal station arranged to strip the mineral particles from the clean mineral media via a stripping medium, the removal station configured to provide a third mixture of a plurality of released media, separated mineral particles and the stripping medium; and a collection station arranged to collect the separated mineral particles and separately discharge the release media and the stripping medium.

BRIEF DESCRIPTION OF THE DRAWING

FIG. 1 illustrates a reactor system, according to an embodiment of the present invention.

FIG. 2 illustrates a mixing station, according to an embodiment of the present invention.

FIG. 2a illustrates a high-pressure mixture scheme, according to an embodiment of the present invention.

FIG. 3 illustrates an interaction station, according to an embodiment of the present invention.

FIG. 4 illustrates a rinsing station, according to an embodiment of the present invention.

FIG. 7 illustrates a mineral separation station, according to an embodiment of the present invention.

FIG. 8 illustrates a mineral collection station, according to an embodiment of the present invention.

FIG. 9 illustrates a media recycling station, according to an embodiment of the present invention.

FIG. 10 illustrates a tumbler reactor, according to an embodiment of the present invention.

FIG. 11 illustrates a movement mechanism arranged to rotate the tumbler reactor, according to an embodiment of the present invention.

FIGS. 13a-13e illustrate an engineered bead with different shapes and structures.

DETAILED DESCRIPTION OF THE INVENTION

Figure 5:
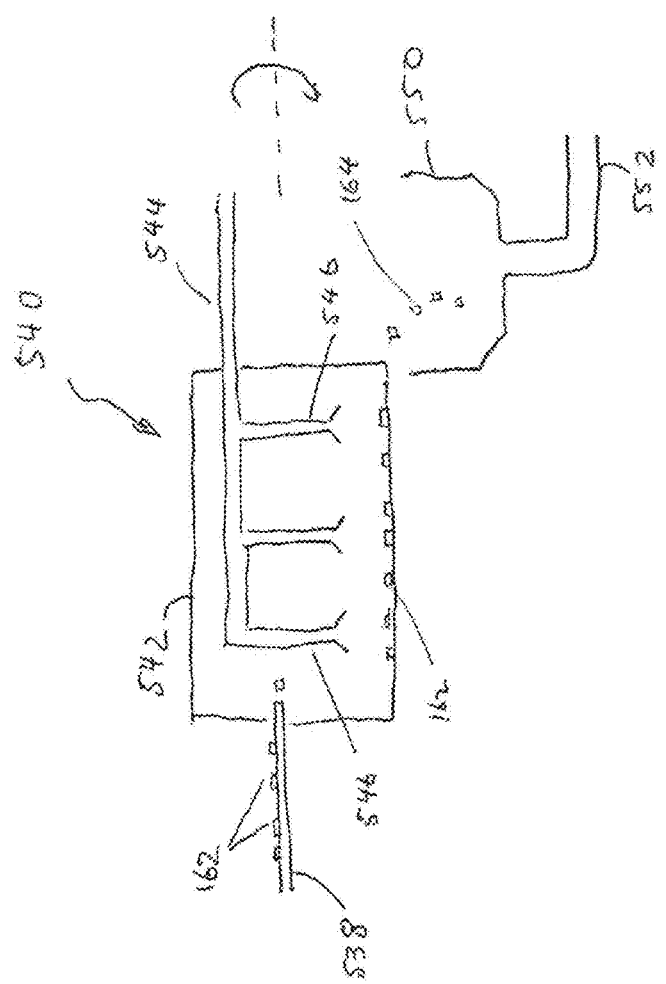
FIG. 5 illustrates a drying station, according to an embodiment of the present invention.

The present invention provides a reactor system having many stages to recover mineral particles in a slurry. These stages are illustrated and described as stations. The system is illustrated and described as a reactor system 500. The reactor system 500 uses barren media 174 to recover minerals from a slurry 177 that contains a mixture of minerals and other materials. The other materials in the slurry 177 are typically referred to as gangue materials, including sands, clays and other materials. The minerals and gangue material are ground to an average particle size. For example, depending on the mineral type, the average particle size of the mixture of minerals and gangue materials may range from fines of only several microns to coarse particles of greater than 800 microns. The ground minerals and gangue are mixed with water to create the slurry 177. In the present example, the mineral is a sulfide-based mineral such as copper, gold, lead, zinc, nickel, iron or other minerals. However, other minerals may be used with the system of the present invention. Additionally, collector chemicals may be added to the slurry. The collector chemicals, such as an xanthate-based collector chemistries, are commonly known in the mining industry. The barren media 174 are herein referred to as engineered collection media or synthetic beads or synthetic bubbles.

FIGS. 1-9

FIG. 1 illustrates the reactor system, according to an embodiment of the present invention. As shown in FIG. 1, the reactor system 500 comprises a mixing station 510, an interaction station 520, a rinsing station 530, a drying station 540, a mineral removal station 560, a mineral separation station 580, a mineral collection station 600 and a media recycling station 620.

FIG. 2 illustrates the mixing station, according to an embodiment of the present invention. As shown in FIG. 2, the mixing station 510 comprises a media and slurry addition hopper 512 or other container arranged to receive the slurry 177 and barren media 174. A piping 514 is arranged to provide a mixture 160 containing barren media 174 and the slurry 177. The barren media 174 may include an open-cell foam structure, bead, bubble or other structure which is coated with a hydrophobic material, such as poly (dimethylsiloxane) or PDMS, to provide a hydrophobic surface. Beads and bubbles are disclosed in commonly owned, co-pending U.S. patent application Ser. No. 14/116, 438 filed Feb. 3, 2014; Ser. No. 14/117,209 filed Feb. 7, 2014, Ser. No. 14/119,048 filed Feb. 14, 2014, U.S. Pat. Nos. 9,302,270 and 9,352,335, which are all hereby incorporated by reference in their entirety. The barren media 174 can be made from foam or sponge that has open cell foam structures *see FIGS. 13d and 13e). By way of example, the open-cell foam structure is disclosed in commonly owned PCT application no. PCT/US17/12689, filed 9 Jan. 2017, which is also hereby incorporated by reference in their entirety.

By way of example, PDMS coating and other media coating materials are disclosed in commonly owned, co-pending U.S. patent application Ser. No. 14/890,477 filed Nov. 11, 2015; PCT PCT/US2015/33485 filed Jun. 1, 2015; Ser. No. 14/116,438 filed Feb. 3, 2014; Ser. No. 14/117,209 filed Feb. 7, 2014, Ser. No. 14/119,048 filed Feb. 14, 2014, U.S. Pat. Nos. 9,302,270 and 9,352,335, which are all hereby incorporated by reference in their entirety.

As described in conjunction with FIG. 3 below, the main purpose of the interaction station is to increase the contact between the mineral particles in the slurry 177 and the barren media 174. Through the interaction between the barren media 174 and the slurry 177, some of the mineral particles in the slurry 177 become attached to the hydrophobic surface of the barren media 174. As such, some of the barren media 174 become mineral laden media 170 carrying mineral particles (see FIGS. 12a and 12b), and the slurry 177 becomes reacted slurry 173.

Figure 12B:
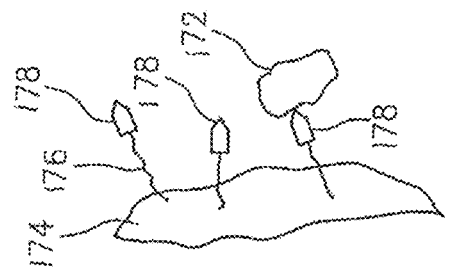
FIG. 12b illustrates part of a loaded bead having molecules to attract mineral particles.
Figure 12A:
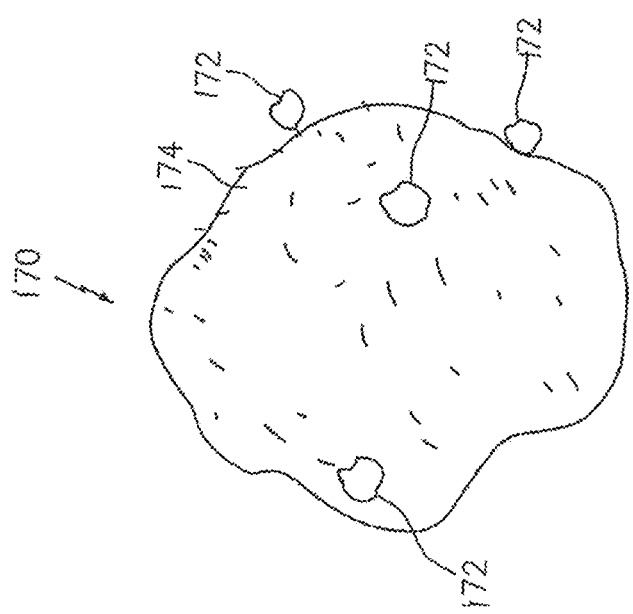
FIG. 12a illustrates a mineral laden synthetic bead, or loaded bead.

According to an embodiment of the present invention, a more deterministic approach is used to increase the encounter between the mineral particles in the slurry 177 and the barren media 174. As shown in FIG. 12a, an enhancer device 516 uses a hydraulic pump 515 or the like to force the mixture 160 to pass through a narrow passage way 517 or a folded path in order to allow the mineral particles to have more chances to attach to the barren media 174. The enhancer device 516 can be a part of the piping 514, for example.

FIG. 3 illustrates the interaction station according to an embodiment of the present invention. As shown in FIG. 3, in the interaction station 520, the mixture 160 of barren medial 74 and slurry 177 is conveyed from the hopper 512 to a tumbler reactor 200 via piping 514. The barren media 174 and slurry 177 may be transported and moved within the piping 514 from the hopper 512 to the tumbler reactor 200 via pneumatic force, hydraulic force, gravity, or other conveyance method to deliver the mixture 160 of barren media 174 and slurry 177 to the tumbler reactor 200. The tumbler reactor 200 can be a vessel that provides further mixing of the slurry 177 and the barren media 174 so that the minerals in the slurry 177 come into contact with, and attach to, the coating on the barren media 174. As such, some of the barren media become mineral laden media 170. The tumbler reactor 200 may be operated to impart energy to the mixture of slurry and media to promote interaction between the minerals in the slurry 177 and the barren media 174. As indicated in FIG. 3, the tumbler reactor 200 is a rotating cylinder having ribs 212 mounted on the internal surfaces of the cylinder to provide additional mixing and energy to the mixture of slurry 177 and barren media 174 so as to encourage interaction between the minerals in the slurry 177 and the hydrophobic coating of the barren media 174.

The tumbler reactor 200 is provided with an output port 524, where a mixture 161 of the mineral laden media 170 and the reacted slurry 173 exits the tumbler reactor 200. The reacted slurry 173 is part of the slurry 177 in which some of the minerals have attached to the barren media 174. In the present example, the ribs 212 on the internal surface of the tumbler reactor 200 are configured to move the mixture 160 of slurry 177 and media 174 from an input end of the tumbler reactor 200 (where the slurry 177 and barren media 174 are received into the tumbler reactor 200) to the output port 524. The output port 524 is arranged to discharge a mixture 161 including the mineral laden media 170 and the reacted slurry 173. The mixture 161 may also contain some barren media 174.

FIG. 4 illustrate the rinsing station according to an embodiment of the present invention. The rinsing station 530 is positioned at the tumbler output port 524. The rinsing station 530 is designed to (1) separate the mineral laden media 170 from the reacted slurry 173; (2) remove the gangue material entrained by the barren media 174 during mixing with the slurry 177 in the tumbler reactor 200, and (3) capture and recycle water used in the rinsing station 530.

According to an embodiment of the present invention, the rinsing station 530 includes a screen separator 532 positioned at the output port 524. The screen separator 532 is arranged to separate the reacted slurry 173 from the mineral laden media 170. The reacted slurry 173 at the output port 524 of the tumbler reactor 200 differs from the slurry 177 received at the input end of the tumbler reactor 200 by the minerals that have been collected by the mineral laden media 170. Similarly, the mineral laden media 170 differs from the barren media 174 received at the input end of the tumbler reactor 200 by the minerals removed from the slurry 177 through attachment to the barren media 174 within the tumbler reactor 200. The reacted slurry 173 is collected in a collection vessel 534 for disposal or further processing. As shown in FIG. 4, a rinsing or rinse-spray system 533 is mounted within the screen separator 532. The rinse-spray system 533 includes one or more water spay nozzles or jets 536 for spaying water on the mineral laden media 170 as they pass through the screen separator 532. According to an embodiment of the present invention, the screen separator 532 is arranged to rotate together with the tumbler 200. The water spray from the spray nozzles 536, combined with the tumbling action imparted to the mineral laden media 170 by the rotating screen separator 532 causes the release of substantially all of the gangue material entrained by the mineral laden media 170, without causing the minerals attached to the mineral laden media 170 from being released. The screen separator 532 can be made of a rigid screen or mesh material, having openings in the screen large enough to allow the passage of the reacted slurry 173 to the collection vessel 534. The openings, however, are small enough to retain the mineral laden media 170 on the screen separator 532. The screen separator 532 is also arranged to transport (though a tumbling action) the mineral laden media 170 to a guide tray 538 which feeds the rinsed mineral laden media 162 into the drying station 540.

FIG. 5 illustrates the drying station 540, according to an embodiment of the present invention. As shown in FIG. 5, the guide tray 538 is positioned at an inlet end of a drying tumbler 542. The drying tumbler 542 can be a rigid screen or mesh that rotates and moves the rinsed mineral laden media 162 from the inlet end to a hopper 550. The hopper 550 is arranged to transport the rinsed mineral laden media 163 to the mineral removal station 560. The drying tumbler 542 is designed to remove the rinse water retained by the rinsed mineral laden media 162, and also assist in the removal of the gangue material entrained by the rinsed mineral laden media 162 that has not been removed in the rinse station 540. As such, substantially all of the gangue material entrained by the mineral laden media 174 is removed prior to delivery of the rinsed mineral laden media 162 to the collection hopper 550. The drying tumbler 542 includes a high pressure air spray system 544 having one or more high pressure air nozzles 546 to assist in the removal of the rinse water and gangue from the rinsed mineral laden media 162. After the removal of rinse water and gangue, the rinsed mineral laden media 162 become cleaned mineral laden media 164, to be delivered to the mineral removal station 560 via transport pipe 522 which is connected to the bottom of the hopper 550. The mineral removal station 560 has an input port 562. The transport pipe 552 is configured to pneumatically transport the cleaned mineral laden media 164 to the input port 562, according to an embodiment of the present invention. It should be noted that, other methods of conveying the cleaned mineral laden media 164 may be utilized, such as gravity, hydraulic transport, or other transport mechanisms.

According to an embodiment of the present invention, high-pressure air streams are also applied to the cleaned mineral laden media 164 in order to overcome the van der Waals forces between the attached minerals and the barren media so as to remove the attached minerals from the mineral laden media.

Figure 6:
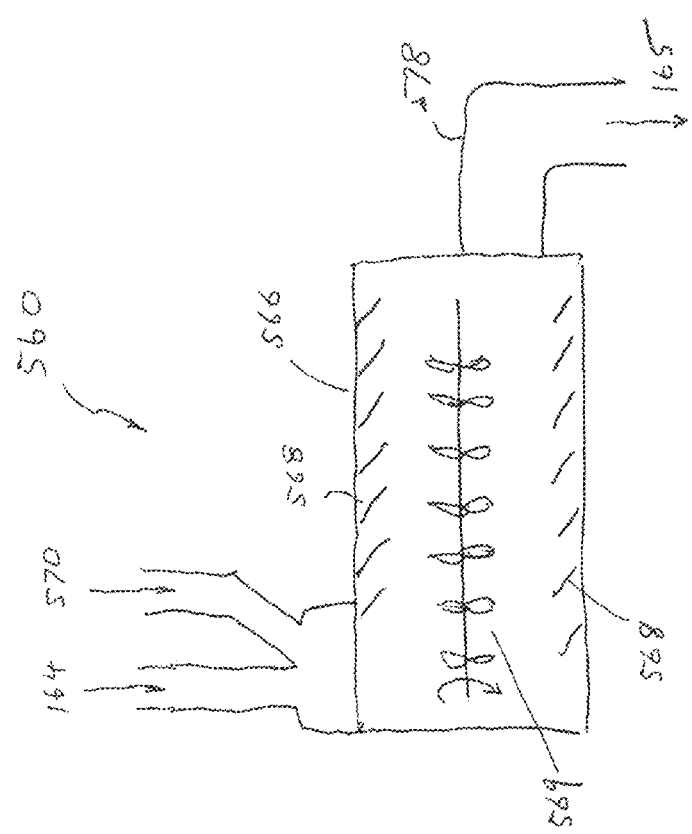
FIG. 6 illustrates a mineral removal station, according to an embodiment of the present invention.

FIG. 6 illustrates the mineral removal station, according to an embodiment of the present invention. As shown in FIG. 6, a second pipe 564 is connected to the input port 562 of the mineral removal station 560 to deliver a mineral removal agent 570. The mineral removal agent 570 is used to remove the minerals from the cleaned mineral laden media 164. The mineral removal agent 570 may include a surfactant to lower the surface tension of the cleaned mineral laden media 164 so as to release the minerals attached to the cleaned mineral laden media 164 in the mineral removal station 560. Suitable surfactants can include alcohols, liquid silicones, various emulsions containing combinations of alcohols and silicones, or other suitable surfactants or other suitable materials. For explanation purposes, the terms surfactant and mineral removal agent are used interchangeably in the description.

It should be noted that, while surfactant is disclosed as being used in the method for releasing minerals from the cleaned mineral laden media 164, other methods of removal, such a mechanical action, ultrasonic action, changes in pH, or other suitable method can also be used, depending on the type of minerals being collected and the selection of the coating of the barren media 174. Other methods of mineral removal are disclosed in commonly owned, co-pending U.S. patent application Ser. No. 14/117,912 filed Feb. 3, 2014, which is incorporated by reference in its entirety.

As shown in FIG. 6, the mineral removal station 560 includes a cylinder body 566 with internal fins 568 that are used to provide the desired fluid dynamics for mixing of the cleaned mineral laden media 164 and the surfactant 570 within the cylinder body 566. Additionally, a horizontal rotating mixing impeller or blade 569 is positioned within the center of the cylinder body 566 to provide mixing and kinetic energy to aid in the release of substantially all of the minerals from the cleaned mineral laden media 164 in the presence of the surfactant 570 so as to obtain separated minerals 586 and released media 574.

As shown in FIG. 6, the internal mixing impeller 569, cylinder body 566 and internal fins 568 are configured to deliver the separated minerals 586 and the released media 574 to an output port 578 of the mineral removal station 560. The released media 574 differ from the cleaned mineral laden media 164 in that the minerals collected by the mineral laden media 170 have been substantially released as the separated minerals 586. In the present of the surfactant 570, the released media 574 and the separated minerals 586 are separated from one another at the output port 578 of the mineral removal station 560. The mixture of the released media 574, separated minerals 586 and surfactant 570 is discharged at the output port 578 to a recycling conveyor belt 582 in the mineral separation station 582. This is the first step in the mineral collection and media recycling.

FIG. 7 illustrates the mineral separation station 580, according to an embodiment of the present invention. In FIG. 7, the recycling conveyor belt 582 is designed with a material that allows for the passage of water, liquid surfactant 570 and separated minerals 586, while retaining and transporting the released media 574. For example, the recycling conveyor belt 582 may be made of a suitable screen or mesh. The released media 574 is retained by the recycling conveyor belt 582, while the surfactant 570 and separated minerals 586 pass through the screen or mesh of the recycling conveyor belt 582. Thereafter, the separated minerals 586 may be collected in a mineral collection vessel or container, and the surfactant 570 is recycled for further use in the mineral removal station 560. Alternatively, the surfactant 570 and separated minerals 586 that pass through the recycling conveyor belt 582 may be directed to a collection vessel 610 and processed in the mineral collection station 600 as shown in FIG. 8.

As shown in FIG. 8, the surfactant 570 and separated minerals 586 collected in the collection vessel 610 are delivered to a thickener 611 by a feed pipe 612. The thickener 611 acts to settle out and separate the separated minerals 586 from the surfactant 570, so that the surfactant 570 may be recycled. As new mixture of surfactant 570 and separated minerals 586 are added to the thickener 611, the separated minerals 586 settle to the bottom of the thickener 611 via the feed pipe 612, and the separated minerals 586 may be removed from a thickener underflow line 613. The surfactant 570 is recovered from a thickener overflow 614, and may be recycled back to the process. Alternatively, the surfactant 570 recovered from the thickener overflow 614 may be fed to a cyclone separator 615. In the cyclone separator 615, small mineral particles suspended in the surfactant and not recovered in the thickener 611 are removed from the surfactant in a cyclone separator underflow 616. Thereafter the small mineral particles are combined with the separated minerals 586 in the thickener underflow line 613. The overflow 617 of the cyclone separator 615 provides cleaned surfactant 570, which is recycled back to the input port 562 of the mineral removal station 560 (FIG. 6).

FIG. 9 illustrates a media recycling station according to an embodiment of the present invention. As shown in FIG. 9, the media recycling station 620 uses a recycling conveyor belt 583 to deliver the released media 574 to a recycling dispersing station 630 that spreads the released media 574 on the recycling conveyor belt 582, and reduces overlap and bunching of the released media 574. The recycling dispersing station 630 may have a number of rigid members 632 that are placed in the path of the released media 574 on the recycling conveyor belt 582 to perform spreading the released media 574 on the recycling conveyor belt 582. The recycling conveyor belt 582 then delivers the released media 574 to a recycling drying station 640 for the removal of the surfactant 570 from the released media 574. The recycling drying station 640 includes an air "knife" or one or more high pressure air jets 642 that expose the released media 574 to sufficient air pressure to remove the surfactant 570. The released media 574 is further delivered by the recycling conveyor belt 582 for rinsing in a recycling rinse station 650. The recycling rinse station 650 includes one or more water jets 652 that spay water on the released media 574 with sufficient pressure in order to remove remaining surfactant from the released media 574. The released media 574 at the output of the recycling rinse station 650 are referred to as recycled media 654 that may be reinjected at the start of the process as barren media 174 for further mineral collection. The recycled media 654 differ from the released media 574 in that the surfactant 570 is substantially removed from the released media 574 and the recycled media 654 is available for mineral collection in substantially the same state as the barren media 174 initially introduced into the system. The recycled media 654 may be reintroduced into the media and slurry addition hopper 512 of the mixing station 510 (FIG. 2). After the recycled media 654 exit the recycling rinse station 650, the recycled media 654 are delivered by the recycling conveyor belt 582 to a recycled media collection hopper 660. A recycled media delivery pipe 662 is connected to the output 664 of the recycled media collection hopper 660. The recycled media collection hopper 660 delivers the recycled media 654 to the media and slurry addition hopper 512 via a recycled media delivery pipe 662. The recycled media delivery pipe 662 utilizes pneumatics to transport the recycled media 654. While pneumatic transport of the recycled media 654 is used in this example, other methods of conveying the recycled media 654 may be utilized, such as gravity, hydraulic transport, or other transport mechanisms.

FIG. 10 illustrates a tumbler cell 201 that can be used as the tumbler reactor 200, according to an embodiment of the present invention. As shown in FIG. 10, the tumbling cell 201 has a container 202 configured to hold a mixture comprising engineered collection media 174 and a pulp slurry or slurry 177. The slurry 177 contains mineral particles (see FIGS. 12a and 12b). The container 202 has a first input 214 configured to receive the engineered collection media 174 and a second input 218 configured to receive the slurry 177. On the other side of the container 202, an output 220 is provided for discharging at least part of the mixture 181 from the container 202 after the engineered collection media 174 are caused to interact with the mineral particles in slurry 177 in the container. The mixture 181 contains mineral laden media or loaded media 170 (see FIG. 12a) and ore residue or tailings 179. The arrangement of the input and output on the container 202 as shown in FIG. 10 is known as a co-current configuration. The engineered collection media 174 have collection surfaces functionalized with a chemical having molecules to attract the mineral particles to the collection surface so as to form mineral laden media (see FIG. 12a). In general, if the specific gravity of the engineered collection media 174 is smaller than the slurry 177, a substantial amount of the engineered collection media 174 in the container 202 may stay afloat on top the slurry 177. If the specific gravity of the collection media 174 is greater than the slurry 177, a substantial amount of the engineered collection media 174 may sink to the bottom of the container 202. As such, the interaction between the engineered collection media 174 and the mineral particles in slurry 177 may not be efficient to form mineral laden media 170. In order to increase or enhance the contact between the engineered collection media 174 and the mineral particles in slurry 177, the container 202 is caused to turn such that at least some of the mixture in the upper part of the container is caused to interact with at least some of the mixture in the lower part of the container 202. After being discharged from the container 202, the mixture 181 comprising mineral laden media 170 and ore residue 179 is processed through a separation device such as a screen 42 so that the mineral laden media 170 and the ore residue 179 can be separated. The mineral laden media 170 are directed by a path or outlet 222 so that the mineral laden media 170 can be collected. The ore residue 179 is directed by a path or outlet 224 to be thickened, for example. It should be noted that the mixture 181 discharged through output 220 also contains mineral particles that are not attached to the engineered collection media 174 to form mineral laden media 170, water and other ore particles in slurry 177, and some unloaded engineered collection media, or barren media 174. After being separated by screen 42, the mineral laden media 170, along with the unloaded engineered collection media 174, are directed to the media output or path 222, while the unattached mineral particles, water and other ore particles in slurry 177 are directed to the slurry output 224 to be treated as tailings or ore residue 179.

The container 202 can be a horizontal pipe or cylindrical drum configured to be rotated, as indicated by numeral 210, along a horizontal axis, for example.

According to various embodiments of the present invention, the surfaces of the engineered collection media 174 are functionalized with a chemical having molecules so as to attract or attach the mineral particles in the slurry to the surfaces of the engineered collection media 174. The engineered collection media comprise synthetic bubbles or beads, and the chemical is selected from the group consisting of polysilloxanes, poly(dimethylsiloxane), hydrophobically-modified ethyl hydroxyethyl cellulose polysiloxanates, alkylsilane and fluoroalkylsilane, for example.

As illustrated in FIG. 11, the tumbler cell 201 is caused to rotate by a movement mechanism 230 either in a clockwise direction or a counter-clockwise direction in a continuous fashion or in an intermittent fashion. The rotation can be in one direction or two directions alternately. The movement mechanism 230 can be an electric motor with a linking belt or driving gears or any suitable movement device.

FIGS. 12a, 12b and 13a-13e

FIG. 12a illustrates a mineral laden synthetic bead, or loaded bead 170. As illustrated, a synthetic bead 174 can attract many mineral particles 172. FIG. 12b illustrates part of a loaded bead having molecules (176, 178) to attract mineral particles.

As shown in FIGS. 12a and 12b, the synthetic bead 170 has a bead body to provide a bead surface 174. At least the outside part of the bead body is made of a synthetic material, such as polymer, so as to provide a plurality of molecules or molecular segments 176 on the surface 174. The molecule 176 is used to attach a chemical functional group 178 to the surface 174. In general, the molecule 176 can be a hydrocarbon chain, for example, and the functional group 178 can have an anionic bond for attracting or attaching a mineral, such as copper to the surface 174. A xanthate, for example, has both the functional group 178 and the molecular segment 176 to be incorporated into the polymer that is used to make the synthetic bead 170. A functional group 178 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 178 include, but are not limited to, thionocarboamates, thioureas, xanthogens, monothiophosphates, hydroquinones and polyamines. Similarly, a chelating agent can be incorporated into or onto the polymer as a collector site for attracting a mineral, such. As shown in FIG. 7b, a mineral particle 172 is attached to the functional group 178 on a molecule 176. In general, the mineral particle 172 is much smaller than the synthetic bead 170. Many mineral particles 172 can be attracted to or attached to the surface 174 of a synthetic bead 170.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 170 has a bead body 180 having a surface comprising a plurality of molecules with one or more functional groups for attracting mineral particles to the surface. A polymer having a functional group to collect mineral particles is referred to as a functionalized polymer. In one embodiment, the entire interior part 182 of the synthetic bead 180 is made of the same functionalized material, as shown in FIG. 13a. In another embodiment, the bead body 180 comprises a shell 184. The shell 184 can be formed by way of expansion, such as thermal expansion or pressure reduction. The shell 184 can be a micro-bubble or a balloon. In FIG. 13b, the shell 184, which is made of functionalized material, has an interior part 186. The interior part 186 can be filled with air or gas to aid buoyancy, for example. The interior part 186 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 184 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 13c, the synthetic bead has a core 190 made of ceramic, glass or metal and only the surface of core 190 has a coating 188 made of functionalized polymer. The core 190 can be a hollow core or a filled core depending on the application. The core 190 can be a micro-bubble, a sphere or balloon. For example, a filled core made of metal makes the density of the synthetic bead to be higher than the density of the pulp slurry, for example. The core 190 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferromagnetic or ferri-magnetic core that attract to paramagnetic surfaces. A core 190 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 170 can be a porous block or take the form of a sponge or foam with multiple segregated gas filled chambers as shown in FIGS. 13d and 13e.

It should be understood that the term "bead" does not limit the shape of the synthetic bead of the present invention to be spherical, as shown in FIGS. 8a-8d. In some embodiments of the present invention, the synthetic bead 170 can have an elliptical shape, a cylindrical shape, a shape of a block. Furthermore, the synthetic bead can have an irregular shape.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. The synthetic beads and/or engineered collection media can be made of a polymer. The term "polymer" in this specification means a large molecule made of many units of the same or similar structure linked together. Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same.

One disadvantage of spherical shaped recovery media such as a bubble, is that it possesses a poor surface area to volume ratio. Surface area is an important property in the mineral recovery process because it defines the amount of mass that can be captured and recovered. High surface area to volume ratios allows higher recovery per unit volume of media added to a cell. As illustrated in FIG. 13e, open-cell foam and sponge-like material can be as engineered collection media. Open cell or reticulated foam offers an advantage over other media shapes such as the sphere by having higher surface area to volume ratio. Applying a functionalized polymer coating that promotes attachment of mineral to the foam "network" enables higher recovery rates and improved recovery of less liberated mineral when compared to the conventional process. For example, open cells allow passage of fluid and particles smaller than the cell size but capture mineral bearing particles the come in contact with the functionalized polymer coating. Selection of cell size is dependent upon slurry properties and application.

The coated foam may be cut in a variety of shapes and forms. For example, a polymer coated foam belt can be moved through the slurry to collect the desired minerals and then cleaned to remove the collected desired minerals. The cleaned foam belt can be reintroduced into the slurry. Strips, blocks, and/or sheets of coated foam of varying size can also be used where they are randomly mixed along with the slurry in a mixing cell. The thickness and cell size of a foam can be dimensioned to be used as a cartridge-like filter which can be removed, cleaned of recovered mineral, and reused.

As mentioned earlier, the open cell or reticulated foam, when coated or soaked with hydrophobic chemical, offers an advantage over other media shapes such as sphere by having higher surface area to volume ratio. Surface area is an important property in the mineral recovery process because it defines the amount of mass that can be captured and recovered. High surface area to volume ratios allows higher recovery per unit volume of media added to a cell.

The open cell or reticulated foam provides functionalized three dimensional open network structures having high surface area with extensive interior surfaces and tortuous paths protected from abrasion and premature release of attached minerals particles. This provides for enhanced collection and increased functional durability. Spherical shaped recovery media, such as beads, and also of belts, and filters, is poor surface area to volume ratio—these media do not provide high surface area for maximum collection of minerals. Furthermore, certain media such as beads, belts and filters may be subject to rapid degradation of functionality.

Applying a functionalized polymer coating that promotes attachment of minerals to the foam "network" enables higher recovery rates and improved recovery of less liberated minerals when compared to the conventional process. This foam is open cell so it allows passage of fluid and particles smaller than the cell size but captures mineral bearing particles the come in contact with the functionalized polymer coating. Selection of cell size is dependent upon slurry properties and application.

A three-dimensional open cellular structure optimized to provide a compliant, tacky surface of low energy enhances collection of hydrophobic or hydrophobized mineral particles ranging widely in particle size. This structure may be comprised of open-cell foam coated with a compliant, tacky polymer of low surface energy. The foam may be comprised of reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The coating may be a polysiloxane derivative such as polydimethylsiloxane and may be modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica. Alternatively, the coating may be comprised of materials typically known as pressure sensitive adhesives, e.g. acrylics, butyl rubber, ethylene vinyl acetate, natural rubber, nitriles; styrene block copolymers with ethylene, propylene, and isoprene; polyurethanes, and polyvinyl ethers as long as they are formulated to be compliant and tacky with low surface energy.

The three-dimensional open cellular structure may be coated with a primer or other adhesion agent to promote adhesion of the outer collection coating to the underlying structure.

In addition to soft polymeric foams, other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. These structures must be similarly optimized to provide a compliant, tacky surface of low energy by coating as above.

The three-dimensional, open cellular structures above may be coated or may be directly reacted to form a compliant, tacky surface of low energy.

The three-dimensional, open cellular structure may itself form a compliant, tacky surface of low energy by, for example, forming such a structure directly from the coating polymers as described above. This is accomplished through methods of forming open-cell polymeric foams known to the art.

The structure may be in the form of sheets, cubes, spheres, or other shapes as well as densities (described by pores per inch and pore size distribution), and levels of tortuosity that optimize surface access, surface area, mineral attachment/detachment kinetics, and durability. These structures may be additionally optimized to target certain mineral particle size ranges, with denser structures acquiring smaller particle sizes. In general, cellular densities may range from 10-200 pores per inch, more preferably 30-90 pores per inch, and most preferably 30-60 pores per inch.

The specific shape or form of the structure may be selected for optimum performance for a specific application. For example, the structure (coated foam for example) may be cut in a variety of shapes and forms. For example, a polymer coated foam belt could be moved through the slurry removing the desired mineral whereby it is cleaned and reintroduced into the slurry. Strips, blocks, and/or sheets of coated foam of varying size could also be used where they are randomly mixed along with the slurry in a mixing cell. Alternatively, a conveyor structure may be formed where the foam is encased in a cage structure that allows a mineral-containing slurry to pass through the cage structure to be introduced to the underlying foam structure where the mineral can react with the foam and thereafter be further processed in accordance with the present invention. The thickness and cell size could be changed to a foam cartridge-like filter whereby the filter is removed, cleaned of recovered mineral, and reused.

The Related Family

This application is also related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576), entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, as well as U.S. patent application Ser. No. 14/118,984, filed 27 Jan. 2014, and is a continuation-in-part to PCT application no. PCT/US12/39631, filed 25 May 2012, which are all hereby incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

This application also related to PCT application no. PCT/US16/62242, filed 16 Nov. 2016, entitled "Utilizing engineered media for recovery of minerals in tailings stream at the end of a flotation separation process," which is also hereby incorporated by reference in its entirety.

The Scope of the Invention

It should be further appreciated that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus comprising:
a tumbler configured to stir a first mixture comprising engineered collection media and a slurry, the slurry containing mineral particles and unwanted materials, the tumbler having an output arranged to provide a second mixture comprising a reacted slurry and mineral laden media; and
a rinsing station comprising a screen separator arranged to receive the second mixture, the rinsing station further comprising one or more spraying nozzles arranged to spray a cleaning liquid onto the second mixture so as to separate the reacted slurry from the mineral laden media, wherein the reacted slurry comprises unwanted materials, said apparatus further comprising
a drying station, wherein the screen separator comprises a plurality of openings dimensioned to avow the reacted slurry to pass there-through while retaining the mineral laden media on the screen separator, wherein the rinsing station is further arranged to transport the mineral laden media to the drying station, and
a mineral removal station, wherein the mineral laden media comprise the cleaning liquid attached thereon in the rinsing station, and wherein the drying station comprises one or more air-jets arranged to blow high-pressure air streams onto the mineral laden media so as to remove the attached cleaning liquid from the mineral laden media, the drying station further arranged to provide cleaned mineral laden media to the mineral removal station.

2. The apparatus according to claim 1, wherein the cleaved mineral laden media comprise mineral particles attached thereon, and wherein the mineral removal station comprises an input port arranged to receive the cleaned mineral laden media, the mineral removal station further having an inlet arranged to receive a mineral removal agent configured to remove the attached mineral particles from the cleaned mineral laden media and to provide separated minerals and released media.

3. The apparatus according to claim 2, wherein the mineral removal station comprises a tumbling cylinder arranged to receive a third mixture containing the cleaned mineral laden media and the mineral removal agent, the tumbling cylinder having an internal surface and a plurality of fins disposed on the internal surface, the mineral station further comprising a plurality of rotating impellers located within the tumbling cylinder, wherein the fins and the rotating impellers are arranged to agitate the third mixture so as to enhance removal of the attached mineral particles from the cleaned mineral laden media.

4. The apparatus according to claim 2, wherein the mineral removal station further comprises an output port arranged to discharge a fourth mixture containing the released media, the separated minerals and at least a part of the mineral removal agent, the apparatus further comprising a conveyor belt arranged to receive the fourth mixture, the conveyor belt comprising a plurality of openings dimensioned to avow the separated minerals and said part of the mineral removal agent to pass through the openings while retaining the released media on the conveyor belt.

5. The apparatus according to claim 4, wherein the separated minerals passed through the openings in the conveyor belt are conveyed to a mineral collection vessel, and said part of the mineral removal agent passed through the openings in the conveyor belt are conveyed back to the inlet of the mineral removal station.

6. The apparatus according to claim 3, wherein the released media comprise a remaining part of the mineral removal agent, and wherein the conveyor belt is arranged to deliver the released media to a recycling drying station, the recycling drying station comprising one or more aft-jets arranged to remove the remaining part of the mineral removal agent from the released media for providing dried media.

7. The apparatus according to claim 6, further comprising a recycling rinsing station, the recycling rinsing station comprising one or more water-jets arranged to spray high-pressure water streams onto the dried media for further removal of the remaining part of the removal agent from the dried media.

8. The apparatus according to claim 6, further comprising a dispersing station, the dispersing station comprising a plurality of rigid members disposed in relationship to the conveyor belt, the rigid members arranged to disperse the released media before the released media are delivered to the recycling drying station.

9. A processing system comprising:
a mixing station arranged to receive engineered collection media and a slurry containing mineral particles and to provide a first mixture of the engineered collection media and the slurry, the engineered collection media functionalized with a hydrophobic material so as to attract the mineral particles;
an interaction station comprising a tumbler having a rotating cylinder arranged to receive the first mixture, the tumbler configured to enhance attaching of the mineral particles on the engineered collection media, wherein the tumbler is further arranged to provide a second mixture comprising a plurality of mineral laden media and a reacted slurry;
a rinsing station comprising a screen separator arranged to receive the second mixture, the rinsing station comprising water spray nozzles arranged to separate the reacted slurry from the mineral laden media, the rinsing station further configured to discharge the reacted slurry and separately provide rinsed mineral laden media, wherein the screen separator is arranged to rotate together with the tumbler;
a drying station arranged to remove water from the rinsed mineral laden media for providing clean mineral laden media;
a removal station arranged to strip the mineral particles from the clean mineral media via a stripping medium, the removal station configured to provide a third mixture of a plurality of released media, separated mineral particles and the stripping medium; and a collection station arranged to collect the separated mineral particles and separately discharge the released media and the stripping medium.

10. The processing system according to claim 9, wherein the engineered collection media comprise collection surfaces functionalized with a chemical having molecules to attract the mineral particles to the collection surfaces so as to form mineral laden media.

11. The processing system according to claim 10, wherein the engineered collection media comprise synthetic beads, and the chemical is selected from the group consisting of polysilloxanes, poly(dimethylsiloxane), hydrophobically-modified ethyl hydroxyethyl cellulose polysiloxanates, alkylsilane and fluoroalkylsilane.

12. The processing system according to claim 11, wherein the synthetic beads are made of an open-cell foam.

* * * * *